UNITED STATES PATENT OFFICE.

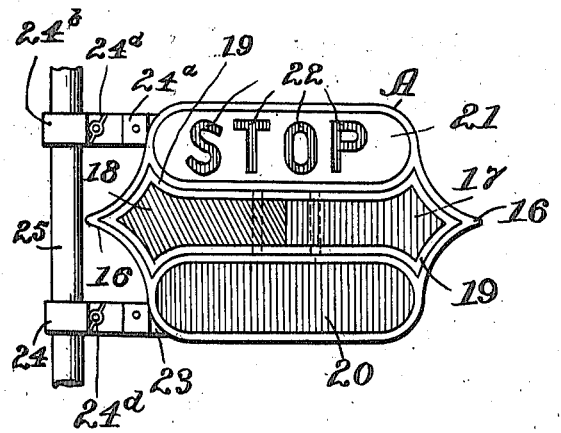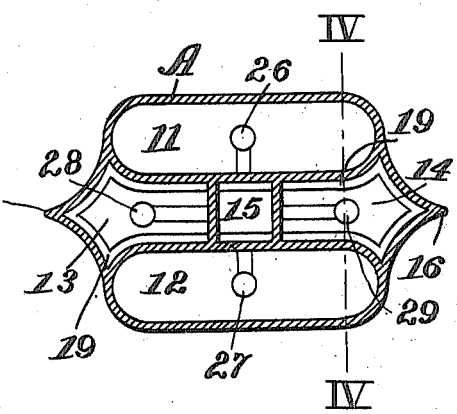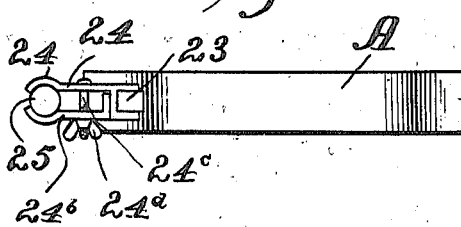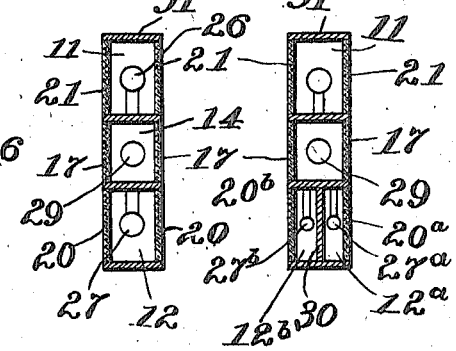

EDWIN T. GRAY AND ALFRED T. HOEVET, OF NEW YORK, N. Y.

AUTOMOBILE-SIGNAL.

1,196,736.           Specification of Letters Patent.     Patented Aug. 29, 1916.

Application filed August 13, 1914, Serial No. 856,662. Renewed November 29, 1915. Serial No. 64,199.

*To all whom it may concern:*

Be it known that we, EDWIN T. GRAY and ALFRED T. HOEVET, citizens of the United States, residing at New York, in the county and State of New York, have invented a new and useful Automobile-Signal, of which the following is a full, clear, and exact specification.

This invention relates to automobile signals for use as a means of indicating the intended movements of automobiles or other vehicles in the day time or at night.

One object of the invention is to provide an improved and simplified illuminated signal by means of which an intention to stop or turn to either right or left can be indicated simultaneously at the front and rear and at a point approximately on the level with the eye at the side of the vehicle.

A further object is to provide a combined signal box and head light.

Other objects will appear as the description proceeds.

The invention will be first hereinafter described in connection with the accompanying drawings, which constitute a part of this specification, and then more specifically defined in the claims at the end of the description.

In the accompanying drawings, wherein similar reference characters are used to designate corresponding parts throughout the several views: Figure 1 is a rear elevation of a signal box constructed in accordance with the present invention. Fig. 2 is a longitudinal vertical sectional view showing the lamps in the several compartments diagrammatically. Fig. 3 is a plan view of the signal box. Fig. 4 is a transverse section taken on the line IV—IV of Fig. 2, and Fig. 5 is a similar view of a modified form of signal box.

One of the signal boxes illustrated is designed to be attached to each side of an automobile or other vehicle and used in connection with a rear or tail signal box illustrated and described in our pending application Serial No. 831,826, filed April 14, 1914.

The present invention relates simply to the side signal boxes illustrated herein, the rear signal box being specifically covered in another application of even date herewith Serial Number 856,663.

Each of the signal boxes A is divided into four compartments 11, 12, 13 and 14. The upper and lower compartments 11 and 12, respectively, are separated by the left and right compartments 13 and 14, and also by a central compartment 15 for the distribution of the electric wiring (not shown) to the lamps in the several signal compartments. Each of the compartments 13 and 14 has its end wall extended and pointed, as at 16, and the ends of the upper and lower compartments are rounded so as to give to said left and right compartments 13 and 14 the shape of arrows pointing respectively to the left and right.

Both front and rear faces of the compartment 14 are covered with red glass or other transparent material 17, while the corresponding faces of the compartment 13 have green panes 18, and in order to make the arrows stand out more distinctly, they are edged by clear or ground white glass borders 19, Figs. 1 and 2. As illustrated in Figs. 1 to 4, inclusive, the bottom compartment 12 is also faced with red glass or other suitable transparent material 20 on both the front and rear faces. The top compartment 11 is covered on both front and rear faces alike with opaque material 21 having clear red letters 22 spelling the word "Stop." It will thus be seen that the signal box will appear exactly the same from both front and rear, so that all signals flashed therefrom will be seen by pedestrians and occupants of vehicles in both directions.

Each of the signal boxes may have lugs 23 cast thereon or otherwise secured thereto, and clamps 24 attached to said lugs are used to fasten the box to a part of the frame of the vehicle, as at 25, for instance, the frame of the wind shield. One member 24ᵃ of the clamp is secured to the lug 23 in the preferred form shown, while the other member 24ᵇ is separate from the lug and adjustably secured to the member 24ᵃ by a bolt 24ᶜ headed at one end and carrying a winged nut 24ᵈ at its other end, as illustrated in Figs. 1 and 3.

A suitable lamp is arranged in each of the signal compartments of the box. As illustrated diagrammatically in Figs. 2, 4 and 5, electric lamps are preferably used. The lamp in the upper compartment 11 is designated 26, and the lamp in the lower compartment is indicated at 27. The lamps in the left and right compartments are designated 28 and 29, respectively. Suitable means (not shown) may be provided for separately switching on the several lamps, as will be readily understood.

In operation, the lamp 27 is kept constantly burning so that it serves as a danger signal in conjunction with the red panes 20 at the front and rear faces of the lower compartment 12. The lamps in the other three compartments are normally out and are adapted to be separately switched on at will. When a turn to the right is to be made, the lamp 29 in the right hand compartment 14 is turned on, thereby illuminating the arrow-shaped red panes 17 in the front and rear faces of said compartments. Inasmuch as these panes 17 point to the right, they will indicate to pedestrians, policemen and all other persons either in front or rear of the vehicle that a turn to the right is intended. The white glass border 19 around the arrow-shaped colored panes make the latter stand out distinctly for a considerable distance. In a similar manner, the switching on of the lamp 28 in the left hand compartment 13 will illuminate the green arrow-shaped panes 18 and indicate an intended turn to the left. When the vehicle is to be stopped, the lamp 26 in the upper compartment 11 is switched on, thereby illuminating the word "Stop" in the panes 21 at the front and rear faces of said compartment.

In Fig. 5, a modified form of signal box A' is illustrated which, however, differs only from the box already described in the construction of the lower compartment. In this instance, the lower compartment is divided longitudinally by a vertical partition 30 into front and rear compartments 12$^a$ and 12$^b$ respectively. This partition may be in the nature of a reflector on one or both sides. A lamp 27$^a$ is arranged in the front compartment 12$^a$ and a lamp 27$^b$ in the rear compartment 12$^b$. The front compartment 12$^a$ is provided with a clear white glass pane 20$^a$, so that the lamp 27$^a$ serves as a head light. The pane 20$^b$ of the rear compartment 12$^b$ is red, so that the lamp 27$^b$ serves as a danger signal. Said lamp 27$^b$ may also be used as a tell-tale for indicating when the tail light (not shown) goes out, but this forms no part of the present invention, being covered in our earlier application above referred to.

It will be noted that the arrangement of the signal boxes at the sides of the vehicle as we contemplate places them about on a level with the eye, so that they can be distinguished much more readily than the tail signal boxes heretofore used. The arrangement of the boxes so that they project at the sides of the vehicle, and the provision of similar signal panes in the front and rear of each signal compartment also constitute important improvements in signals of this kind, as will be readily appreciated, each signal being simultaneously flashed to the front and rear. While the distinctive colors of the arrow-shaped panes help to designate the direction in which a turn is to be made, the shape of said panes with the arrows pointing in the opposite directions unmistakably indicate such intended movements of the vehicle.

Having thus described our invention, what we claim as new and desire to secure by Letters Patent of the United States is:—

1. A signal box for vehicles having a plurality of compartments with colored panes, two of said panes being shaped like arrows and having clear borders for the purpose specified, said arrows pointing in opposite directions, and lamps in said compartments adapted to be separately turned on for the purpose specified.

2. A signal box for vehicles having a plurality of compartments including upper and lower compartments generally elliptical in form with rounded ends, and right and left compartments having straight portions arranged between said upper and lower compartments and pointed projections extending outwardly from the rounded ends of said upper and lower compartments, whereby said right and left compartments are given an arrow-shape, panes in said compartments and lamps therein adapted to be separately turned on for the purpose specified.

In testimony whereof we have signed our names to this specification in the presence of two attesting witnesses.

EDWIN T. GRAY.
ALFRED T. HOEVET.

Witnesses:
HENRY J. MITTAG,
E. STEUERNAGEL.